United States Patent
Ko et al.

(10) Patent No.: US 8,461,963 B2
(45) Date of Patent: Jun. 11, 2013

(54) ACCESS AUTHORIZATION METHOD AND APPARATUS FOR A WIRELESS SENSOR NETWORK

(75) Inventors: Lee-Chun Ko, Taipei (TW); Virgil D. Gligor, Pittsburgh, PA (US); Hayan Lee, Seoul (KR)

(73) Assignees: Industrial Technology Research Institute, Hsinchu (TW); Carnegie Mellon University, Pittsburgh, PA (US)

( * ) Notice: Subject to any disclaimer, the term of this patent is extended or adjusted under 35 U.S.C. 154(b) by 637 days.

(21) Appl. No.: 12/652,743

(22) Filed: Jan. 6, 2010

(65) Prior Publication Data

US 2011/0084800 A1 Apr. 14, 2011

(30) Foreign Application Priority Data

Oct. 14, 2009 (TW) .................. 98134815 A

(51) Int. Cl.
 *G08B 5/22* (2006.01)
(52) U.S. Cl.
 USPC ........................... 340/7.2; 340/5.74; 370/313
(58) Field of Classification Search
 USPC .............. 340/539.2, 5.74, 7.2; 709/224, 223; 455/410; 370/220, 313
 See application file for complete search history.

(56) References Cited

U.S. PATENT DOCUMENTS

| | | | | |
|---|---|---|---|---|
| 5,612,682 A * | 3/1997 | DeLuca et al. | ................ | 340/5.74 |
| 5,907,491 A * | 5/1999 | Canada et al. | ................ | 700/108 |
| 6,567,121 B1 * | 5/2003 | Kuno | ......................... | 348/211.3 |
| 6,859,831 B1 * | 2/2005 | Gelvin et al. | ................ | 709/224 |
| 7,218,917 B2 * | 5/2007 | Pradhan et al. | ............ | 455/412.1 |
| 7,305,467 B2 * | 12/2007 | Kaiser et al. | .................... | 709/224 |
| 7,418,596 B1 * | 8/2008 | Carroll et al. | .................... | 713/169 |
| 7,447,494 B2 * | 11/2008 | Law et al. | ...................... | 455/410 |
| 7,664,080 B2 * | 2/2010 | Ganesh | .......................... | 370/338 |
| 7,715,308 B2 * | 5/2010 | Ramaswamy | ................ | 370/217 |
| 7,788,703 B2 * | 8/2010 | Jou et al. | ............................ | 726/2 |
| 7,793,103 B2 * | 9/2010 | Fu et al. | .......................... | 713/171 |
| 8,000,468 B2 * | 8/2011 | Huang | ............................ | 380/28 |

(Continued)

FOREIGN PATENT DOCUMENTS

| | | |
|---|---|---|
| CN | 1739039 A | 2/2006 |
| CN | 1838600 A | 9/2006 |
| TW | 200614767 | 5/2006 |
| WO | 2008081547 A1 | 7/2008 |

OTHER PUBLICATIONS

Taiwan Patent Office, Office Action, Patent Application Serial No. TW098134815, Jan. 30, 2013, Taiwan.

(Continued)

*Primary Examiner* — Jennifer Mehmood
*Assistant Examiner* — Rufus Point

(57) ABSTRACT

An access authorization method and apparatus for a wireless sensor network comprises at least a base station and a wireless sensor network formed by a plurality of sensor nodes. After having obtained an access authorization of a user, the at least a base station issues a request message to a target sensor node in the wireless sensor network. The target sensor node requests at least a controlling node in the wireless sensor network for sensing data sensed by the at least a controlling node, and checks if the sensing data meets the requirements of the access authorization of the user. Whether the target sensor node responds with the required multimedia or not is based on the checking result.

25 Claims, 18 Drawing Sheets

U.S. PATENT DOCUMENTS

| | | | |
|---|---|---|---|
| 8,045,511 B2 * | 10/2011 | Ryu et al. | 370/328 |
| 8,140,658 B1 * | 3/2012 | Gelvin et al. | 709/224 |
| 8,204,971 B2 * | 6/2012 | Ewing et al. | 709/221 |
| 2002/0197979 A1 * | 12/2002 | Vanderveen | 455/410 |
| 2003/0005030 A1 * | 1/2003 | Sutton et al. | 709/200 |
| 2003/0151513 A1 * | 8/2003 | Herrmann et al. | 340/573.1 |
| 2003/0189649 A1 | 10/2003 | Kuno | |
| 2004/0098395 A1 * | 5/2004 | Hisano | 707/100 |
| 2006/0062201 A1 * | 3/2006 | Funk et al. | 370/352 |
| 2006/0088012 A1 * | 4/2006 | Ganesh | 370/338 |
| 2006/0088013 A1 * | 4/2006 | Ganesh | 370/338 |
| 2006/0088014 A1 * | 4/2006 | Ganesh | 370/338 |
| 2006/0126501 A1 | 6/2006 | Ramaswamy | |
| 2006/0176176 A1 * | 8/2006 | Kang et al. | 340/539.26 |
| 2006/0202834 A1 * | 9/2006 | Moriwaki | 340/573.1 |
| 2006/0242285 A1 * | 10/2006 | Moriwaki | 709/223 |
| 2007/0198708 A1 * | 8/2007 | Moriwaki et al. | 709/224 |
| 2008/0055113 A1 * | 3/2008 | Muro et al. | 340/870.16 |
| 2008/0084294 A1 * | 4/2008 | Zhiying et al. | 340/539.22 |
| 2008/0233920 A1 * | 9/2008 | Laitinen | 455/411 |
| 2008/0240105 A1 * | 10/2008 | Abdallah | 370/392 |
| 2008/0276092 A1 | 11/2008 | Eberhardt et al. | |
| 2009/0210075 A1 * | 8/2009 | Moriwaki | 700/28 |
| 2009/0300525 A1 * | 12/2009 | Jolliff et al. | 715/764 |
| 2010/0150048 A1 * | 6/2010 | Tsai et al. | 370/312 |
| 2011/0084800 A1 * | 4/2011 | Ko et al. | 340/5.74 |

OTHER PUBLICATIONS

China Patent Office, Office Action, Patent Application Serial No. CN200910207351.9, Feb. 5, 2013, China.

* cited by examiner

| QID | C' | {acc_auth}$_k$ | N | Sensing data type and computation method | Identification of controlling node | Valid range of sensing data |
|---|---|---|---|---|---|---|

FIG. 16

ACCESS AUTHORIZATION METHOD AND APPARATUS FOR A WIRELESS SENSOR NETWORK

TECHNICAL FIELD

The disclosure generally relates to an access authorization method and apparatus for a wireless sensor network (WSN).

BACKGROUND

A wireless sensor network (WSN) includes a plurality of tiny, distributed, low-power and low-complexity sensor nodes to work collaboratively to monitor the physical environment information, such as, temperature, humidity, vibration, luminance, pressure, gas, density, and so on. Multimedia data, such as video or audio data, may also be collected and transmitted by WSN. The collected data are mainly for detecting certain events or triggering other actions. WSN may be applied to building structure detection, earthquake activity detection, security surveillance, forest fire and battlefield monitoring.

FIG. 1 shows an exemplary schematic view of the structure of a WSN. Referring to FIG. 1, a WSN 105 is formed by a plurality of sensor nodes, such as sensor node 131, and each sensor node transmits the sensing data to a base station (BS) 110 in a multi-hop manner. BS 110 collects sensing data and uses Internet 114 to transmit to a server 116. The server may be, such as, a web server. A user, such as, user 118, 120, may remotely login through Internet 114 to server 116. After server 116 authenticates the identity and access rights of the user, the user may access the sensing data of the sensor nodes in WSN 110 according to the user's respective access rights.

In the WSN application, the collection of sensing data is usually executed by transmitting sensing data periodically to the BS or through other specific process to gather and transmit back to the BS. The back-end server then analyzes and process sensing data for the users to access. As the multimedia data is usually much more in quantity than the general sensing data, and the WSN is limited by communication capability and low-power sensing nodes, this type of data collection is usually collected on demand; that is, when the collection is triggered when the user issues the demand. Also, the collection of multimedia data often involves the privacy issue.

For example, when the WSN is applied to security surveillance, the user usually expects the security guard is able to capture the intruder by watching the video when an intrusion occurs, while also expects to shield the privacy fields from the security guard. If the WSN continuously reports the sensing data through the BS to the server, the server may determine, based on the sensing information, whether a specific event has occurred, and then activate the access authority of the guard or specific user to access the video data. In other words, the user's access authorization comes from the information provided by reliable elements, and the determination of access authorization is also accomplished in a trusted and secured environment element isolated from attack, such as, secured core, reliable computing base or secured computing device. Hence, the physical sabotage or attack is excluded from the assumption.

However, this approach may accelerate the power consumption of the BS's neighboring nodes because of continuously routing packets. Therefore, a key technology of WSN is in designing a safe access control suitable for the WSN to allow different access privileges for different users and grant some users with immediate access privilege for multimedia data in case of emergency.

Taiwan Patent Publication No. 200614767 of FIG. 2 discloses a data authorization method, applicable to the authorization operation for sharing data between two mobile devices. As shown in the exemplary flowchart of FIG. 2, mobile device A transmits a shared packet to mobile device B. The packet contains shared data and corresponding data rule. Based on initial data rule and environment sensing data, mobile device B determines whether having the access privilege to the shared data in the packet. In other words, the first mobile device transmits the data to be shared to the second mobile device, and the second mobile device decides whether it has the access privilege to read the shared data, where the environment sensing information of the decision on the access authorization rule does not include any physical environment information.

U.S. Pat. No. 7,447,494 in FIG. 3 discloses a secure wireless authorization system, applicable to two devices using a server remotely for access authorization authentication so that a remote third party entity may access another remote user device. As shown in the exemplary embodiment of FIG. 3, a user 310 uses a secure manner to login to an authorization server 312 and stays connected. Then, a remote third party entity 320 issues an authorization request. Authorization server 312, after authenticating the related information of authorization request, agrees to allow the remote third party entity to execute the process. That is, the access authorization authentication is completely executed by authorization server 312.

SUMMARY

The exemplary embodiments of the disclosure may provide an access authorization method and apparatus for a wireless sensor network.

In an exemplary embodiment, the disclosed relates to an access authorization apparatus for a wireless sensor network. The apparatus comprises at least a base station (BS), and a wireless sensor network (WSN) formed by a plurality of sensor nodes. After having obtained an access authorization of a user, the at least a base station issues a request to a target sensor node in the wireless sensor network. The target sensor node requests the at least a controlling node in the wireless sensor network for data sensing by the at least a controlling node, and checks if the sensing data meets the requirements of the access authorization of the user. Whether the target sensor node responds with the required multimedia data or not is based on the checking result.

In another exemplary embodiment, the disclosed relates to an access authorization method for a wireless sensor network. The method comprises: obtaining an access authorization of a user through at least a base station; selecting at least a controlling node from a plurality of sensor nodes of the wireless sensor network and selecting at least a routing node for the base station to a target sensor node; issuing a request through the base station to the target sensor node, the request having at least authentication information; based on the request, the target sensor node requesting to the at least selected controlling node to return sensing data and, based on the returned sensing data, determining whether the requirements of the access authorization of the user are met and issuing a corresponding reply; based on the authentication information, the at least a routing node checking the reply and determining whether to discard or transfer the reply; and authenticating the transferred reply through the base station.

The foregoing and other features, aspects and advantages of the disclosure will become better understood from a careful reading of a detailed description provided herein below with appropriate reference to the accompanying drawings.

BRIEF DESCRIPTION OF THE DRAWINGS

FIG. 16 shows an exemplary schematic view of a common format of the request message, consistent with certain disclosed embodiments.

DETAILED DESCRIPTION OF THE EXEMPLARY EMBODIMENTS

The disclosed exemplary embodiments provide an access authorization technology for a wireless sensor network (WSN). The design is to transmit the access authorization data of a user to a target sensor node in the WSN, and then the other sensor nodes of the WSN collaborate to return the sensed physical environment information, such as, temperature, humidity, luminance, vibration, pressure, gas, density, and so on, for distributed access authorization determination to decide whether to return the data to the user for access. The access authorization technology may be applied to a multi-mode WSN environment for access authorization control of the user to access the multimedia data, such as video or audio data, sensed by the WSN.

Figure 1:
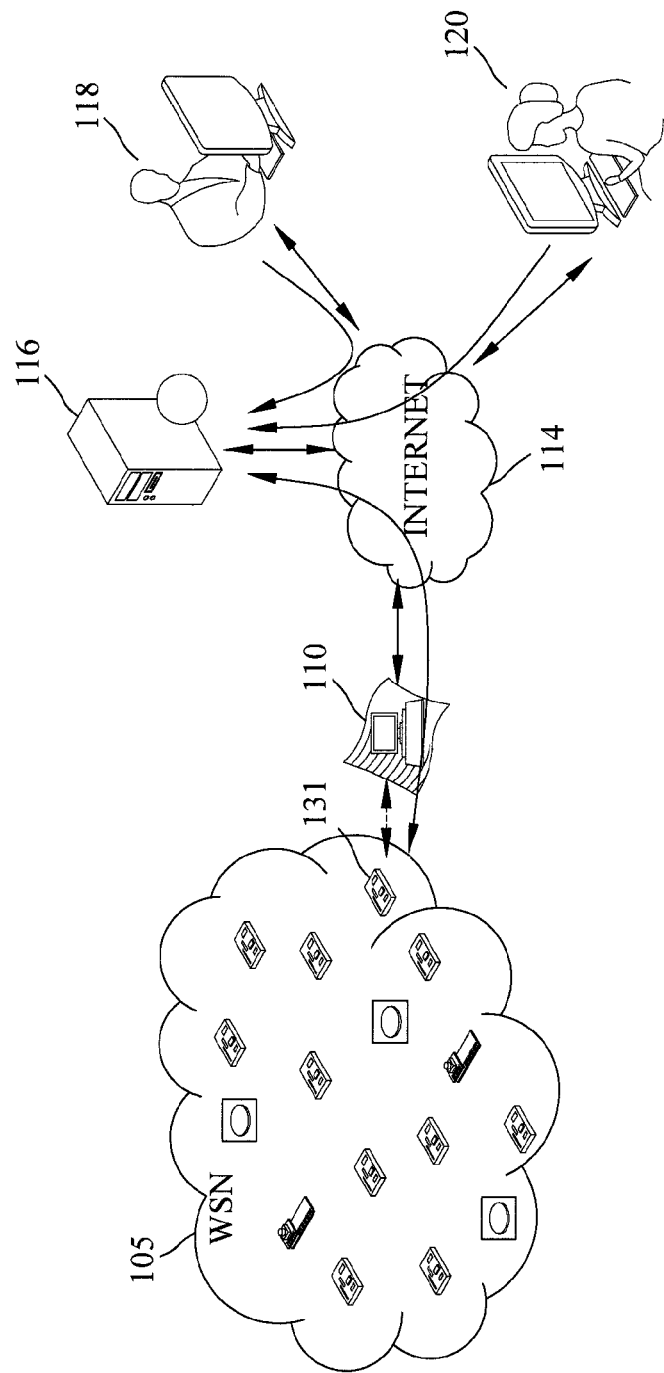
FIG. 1 shows an exemplary schematic view of an application of wireless sensor network.
Figure 2:
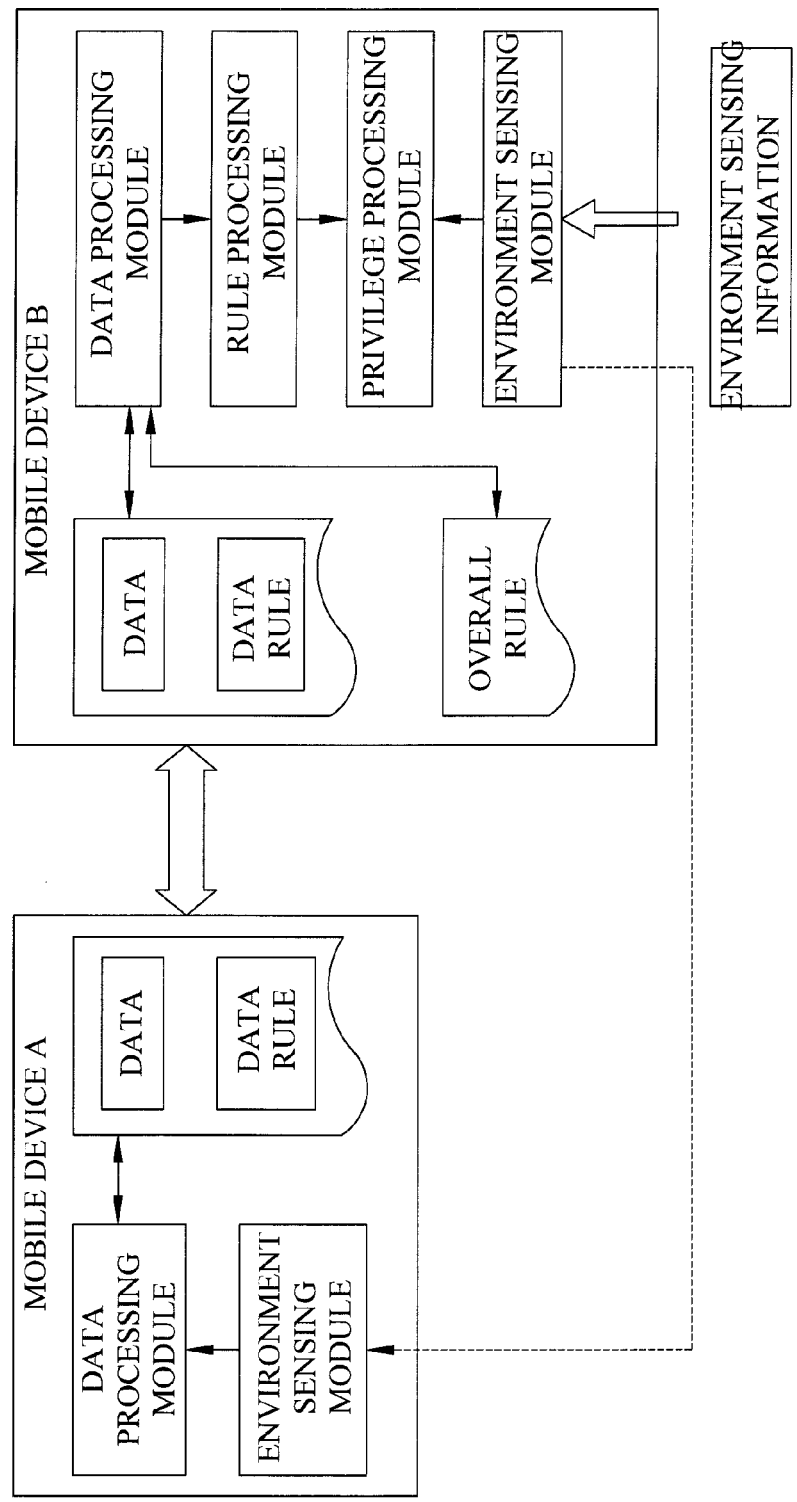
FIG. 2 shows an exemplary flowchart of data authorization method.
Figure 3:
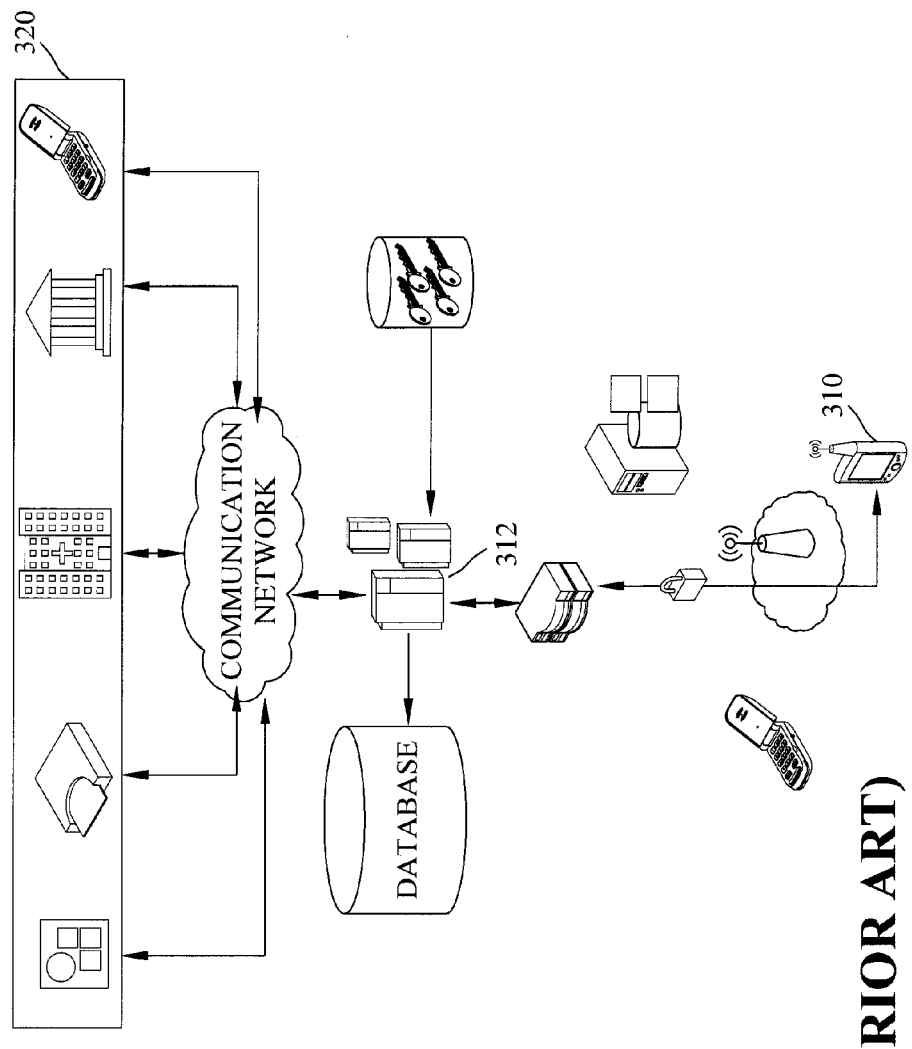
FIG. 3 shows an exemplary schematic view of a secure wireless authorization system.
Figure 4:
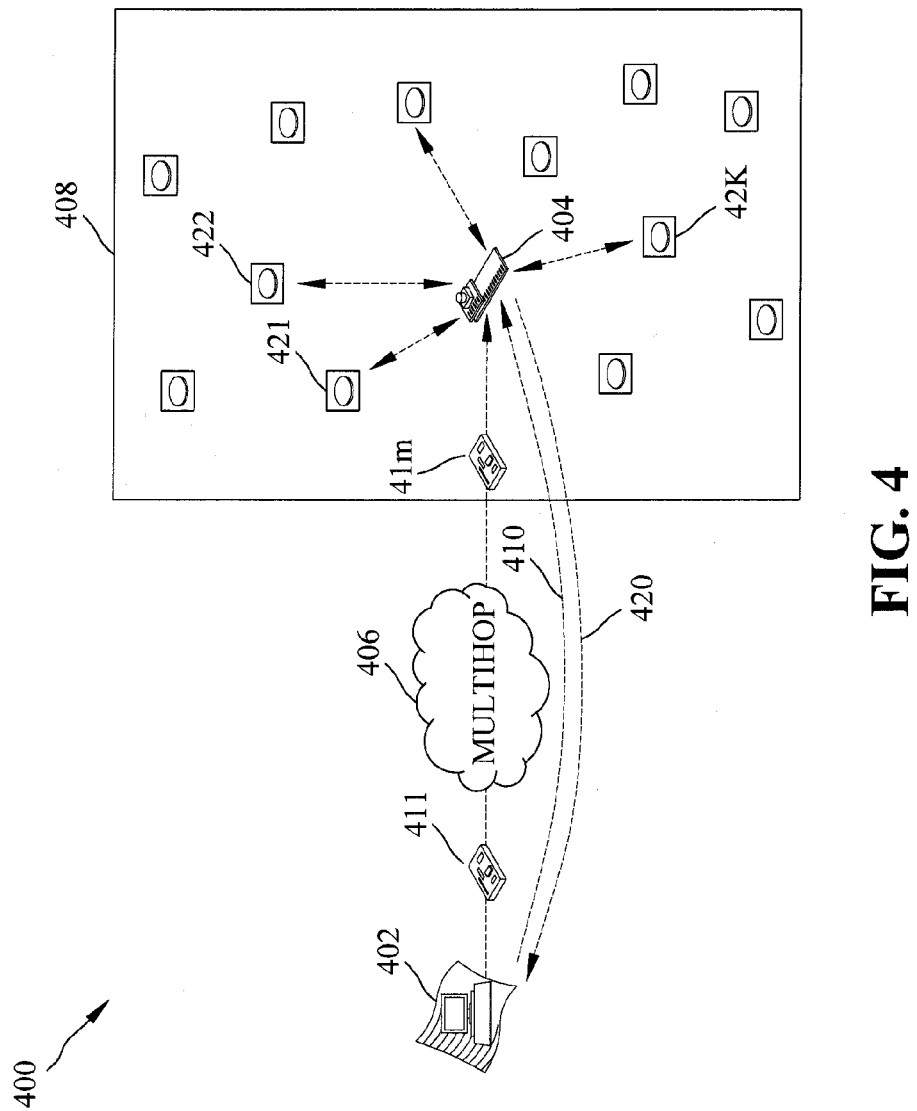
FIG. 4 shows an exemplary schematic view of a scenario of a wireless sensor network, consistent with certain disclosed embodiments.

FIG. 4 shows an exemplary schematic view of a scenario of a wireless sensor network, consistent with certain disclosed embodiments. In an exemplary embodiment 400, there are m intermediate routing nodes 411-41m from BS 402 to target sensor node 404, and WSN 400 uses multihop 406 to execute the data transmission of request message from BS 402 to target sensor node 404, marked by arrow 410. Region 408 having target sensor node 404 also includes a plurality of sensor nodes. Region 408 indicates the range that target sensor node 404 and other sensor nodes may communicate with each other, where a plurality of sensor nodes, such as sensor nodes 421-42k, may provide other sensing data of region 408 to target sensor node 404 for performing the determination of access authorization of the users. This type of sensor node that is able to provide the other sensing data of the same region to the target sensor node for determination of access authorization of the user is called controlling node of the region. After target sensor node 404 determines meeting the access authorization requirements, target sensor node 404 responds with multimedia data, marked by arrow 420.

Because the determination of access authorization is accomplished on the sensor node, the sensor node may encounter node compromised attacks. The goal of the attacker is to bypass, without valid access authorization, the access authorization determination to obtain multimedia data of a certain region. In other words, the sensing data of some region does not meet the requirement of access authorization, and the disclosed exemplary embodiments are to prevent these attacks. FIG. 5-FIG. 9 show five exemplars of attack models. The five possible attack models include attack to impact the message transmission, attack to sabotage target sensor node, attack to sabotage controlling node, attack to move target sensor node and attack to move controlling node.

Figure 5:
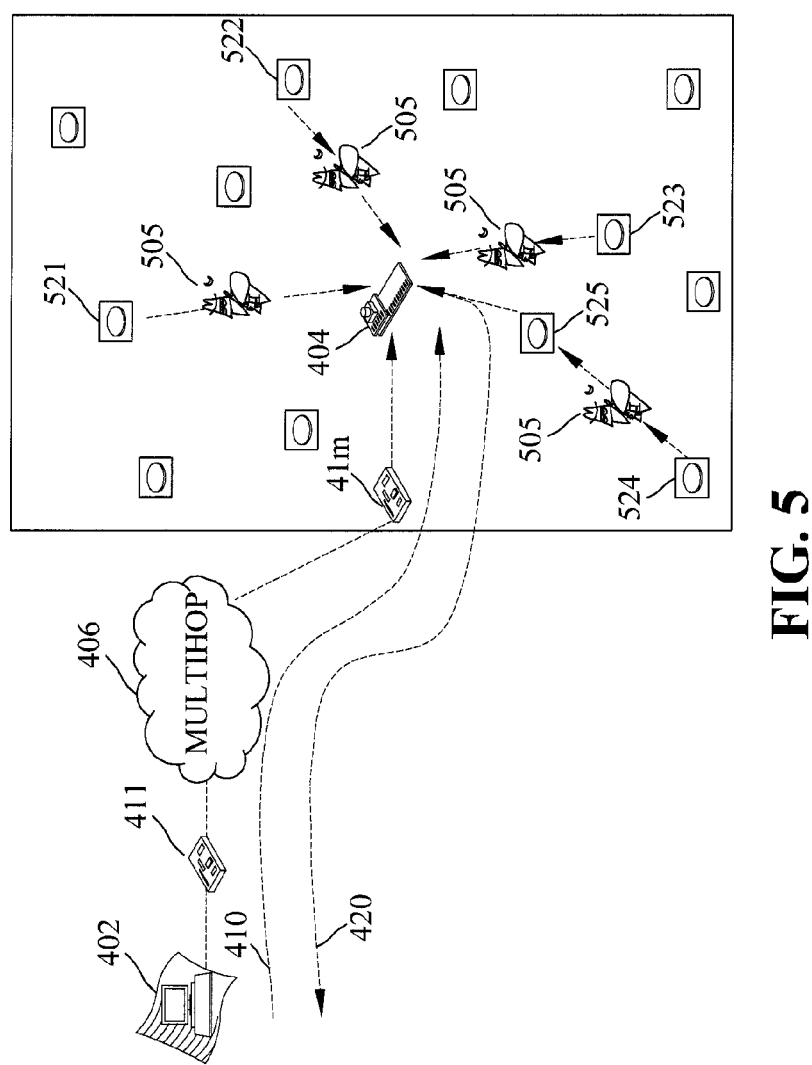
FIG. 5 shows an exemplary schematic view of the attack model affecting the message transmission.
Figure 6:
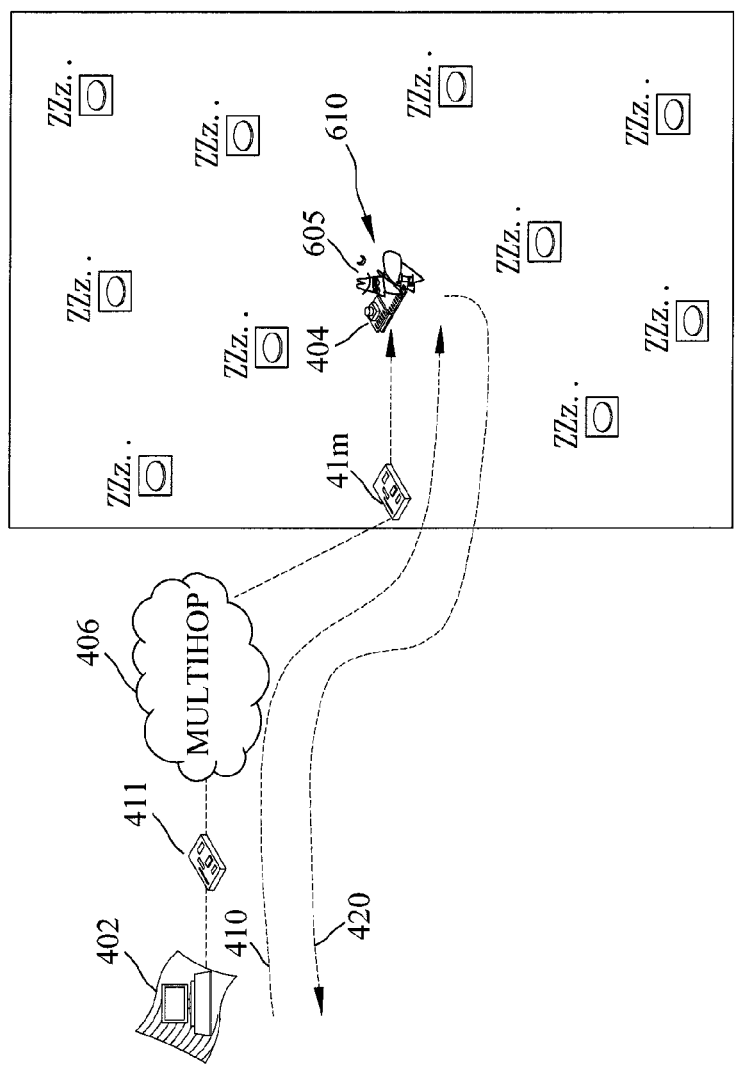
FIG. 6 shows an exemplary schematic view of the attack model of sabotaging the target sensor node.
Figure 7:
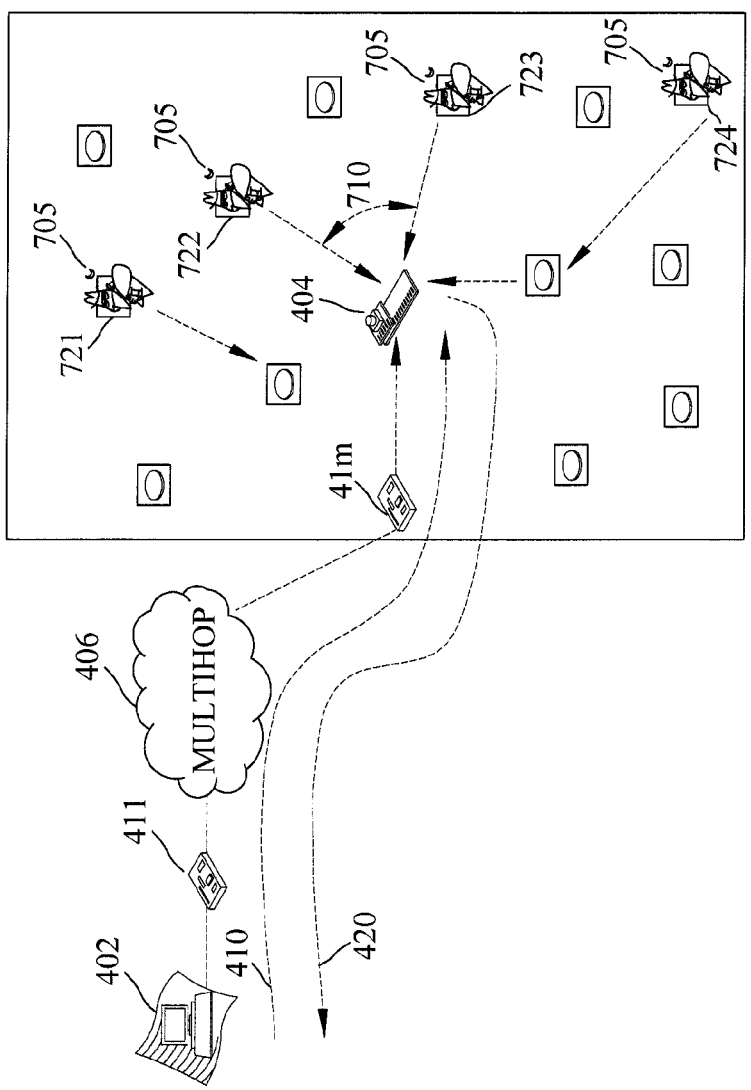
FIG. 7 shows an exemplary schematic view of the attack model of sabotaging the controlling node.

The exemplary attack model of FIG. 5 is the attack to impact or manipulate the message transmitted by controlling node to target sensor node to pass the access authorization determination, for example, attacker 505 modifies or re-sends the sensing data meeting the access authorization determination transmitted by controlling nodes 521-525 to target sensor node 404. The exemplary attack model of FIG. 6 shows attacker 605 to sabotage target sensor node 404, marked by arrow 610; and then, as marked by arrow 420, to transmit multimedia data directly back to BS without inquiring the neighboring controlling node of the sensing data to determine whether the environment data meet the access authorization requirement. The exemplary attack model of FIG. 7 shows that attacker 705 sabotages controlling nodes 721-724, and then transmits false sensing data to target sensor node 404 to meet the access authorization determination, as marked by arrow 710.

Figure 8:
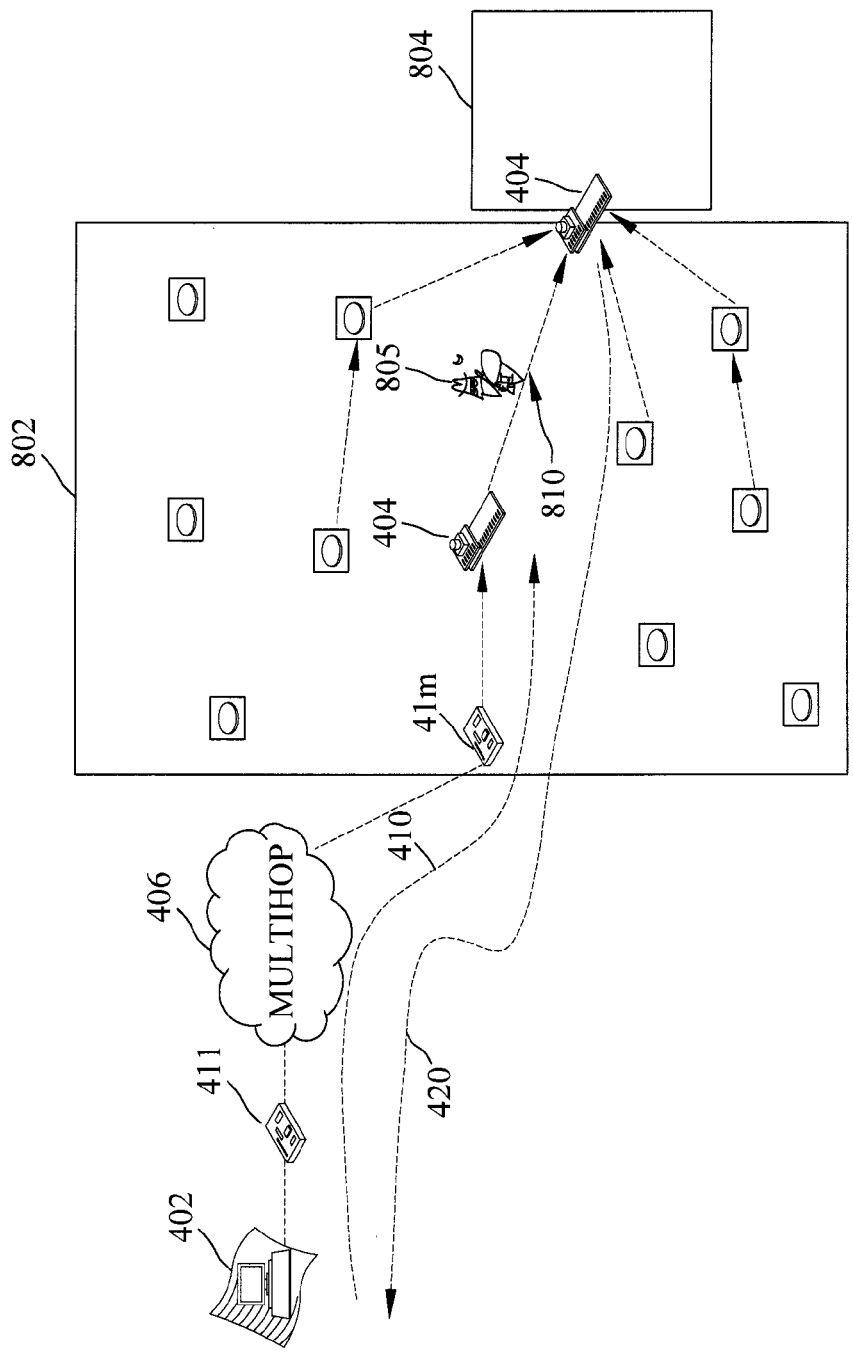
FIG. 8 shows an exemplary schematic view of the attack model of moving the target sensor node.

The exemplary attack mode of FIG. 8 shows that attacker 805 has the access privilege to the target video or audio sensing data of a region 802. Attacker 805 may move target sensor node 404 to another region 804, marked by arrow 810. This leads to that attacker 805 may illegally obtain the multimedia data of another region 804.

Figure 9:
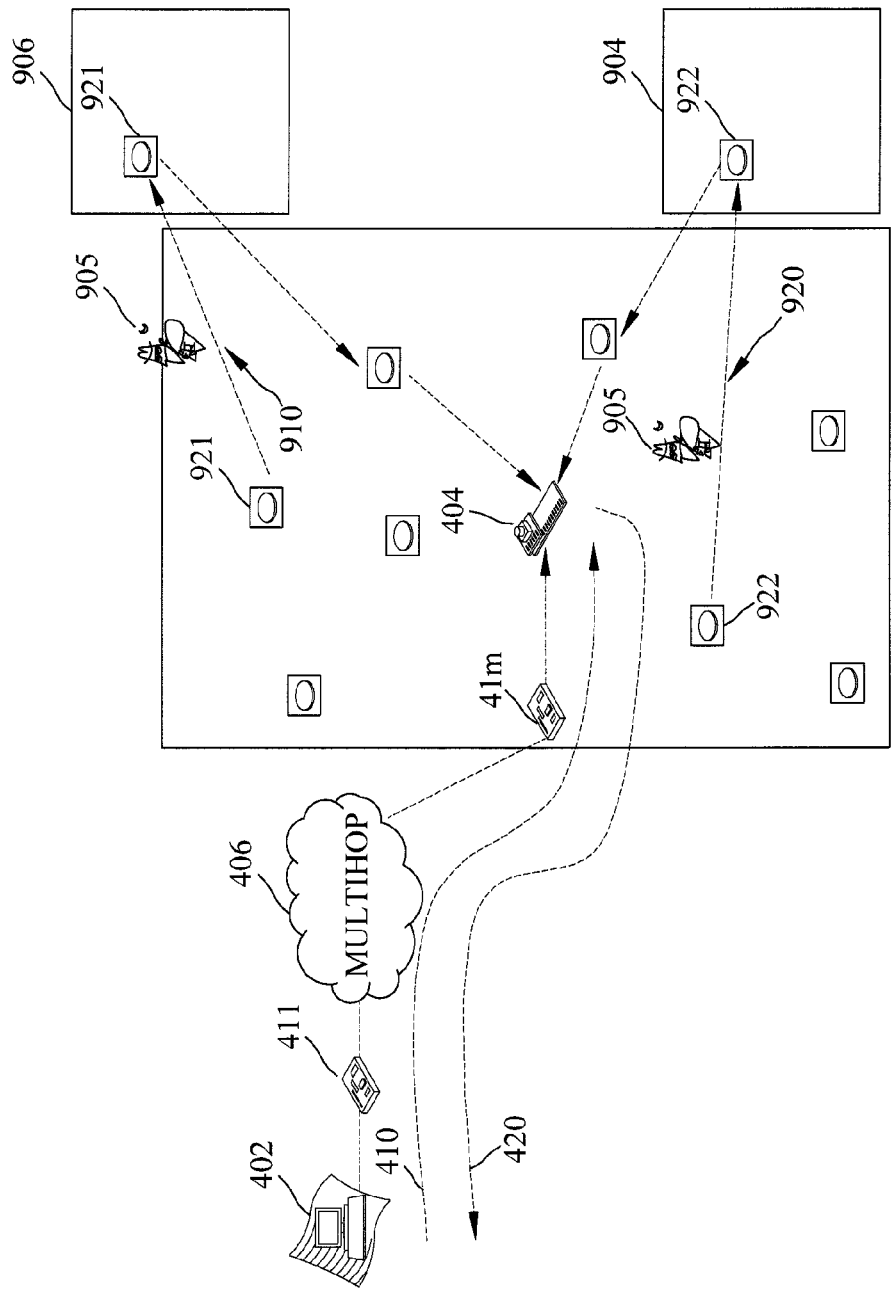
FIG. 9 shows an exemplary schematic view of the attack model of moving the controlling node.

The exemplary attack model of FIG. 9 shows that the attacker moves the controlling node to another physical environment meeting the access authorization requirements. For example, attacker 905 moves controlling node 921 to another region 906, marked by arrow 910. Attacker 905 moves controlling node 922 to another region 904, marked by arrow 920. This leads to that the attacker may illegally obtain the multimedia data.

The physical environmental data detected by the sensor nodes, such as, temperature, humidity, luminance, vibration, and so on, are used as conditions for access authorization determination. In addition, to transmit a large amount of multimedia data in a resource-limited WSN is a huge load that is also major power consumption. Hence, the disclosed exemplary access authorization apparatus for WSN includes a corresponding mechanism to handle the errors or attacks related to physical environment data detection; for example, the erroneous messages, such as the messages modified by the attackers or illegal response messages in the aforementioned attack models, will be filtered and discarded in the intermediate process without returning to BS. In this manner, the waste of resource caused by the intermediate routing nodes delivering the erroneous messages is avoided.

Figure 10:
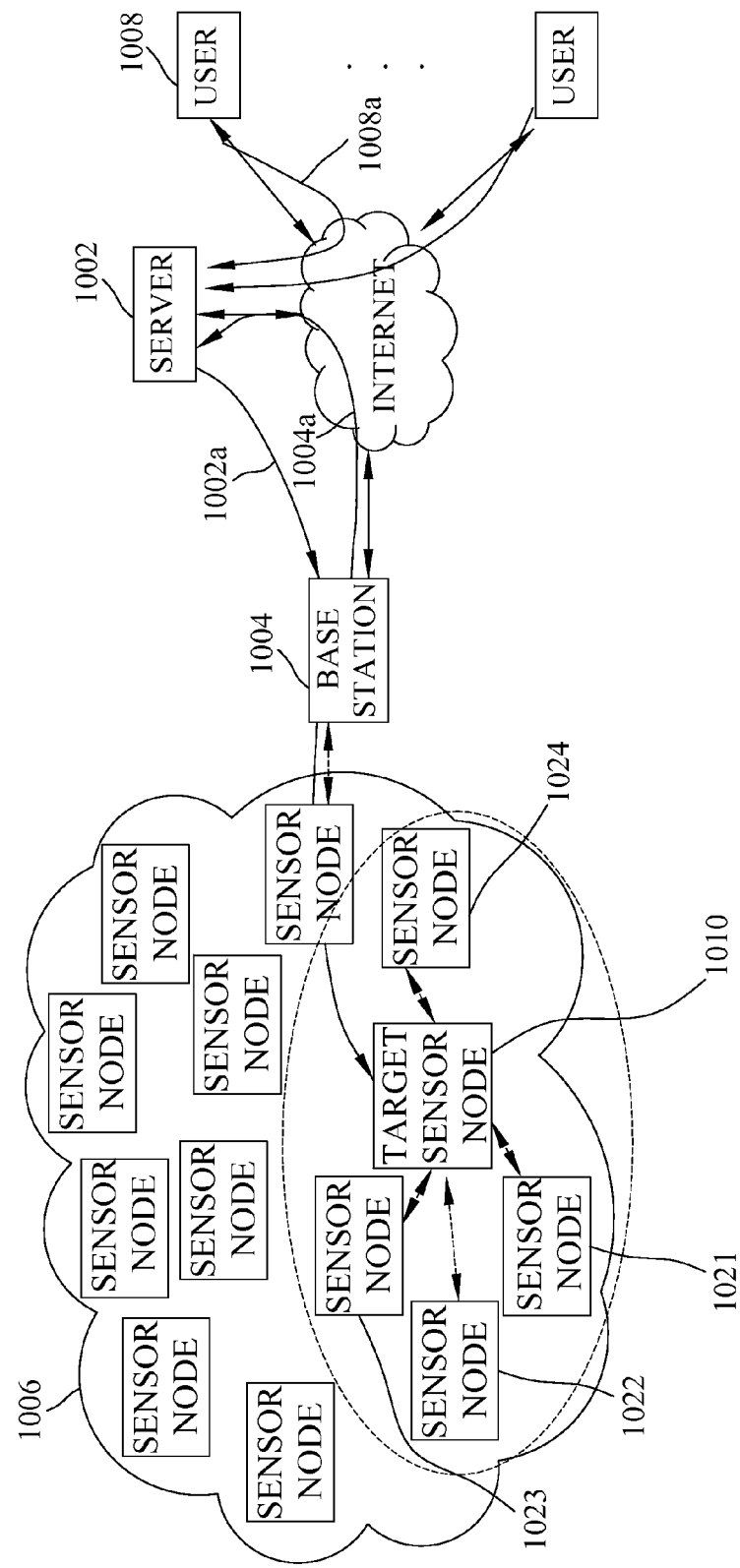
FIG. 10 shows an exemplary schematic view of an access authorization apparatus for a wireless sensor network, consistent with certain disclosed embodiments.

FIG. 10 shows an exemplary schematic view of an access authorization apparatus for a wireless sensor network, consistent with certain disclosed embodiments. As shown in FIG. 10, access authorization apparatus may comprise at least a BS 1004, and a WSN 1006 formed by a plurality of sensor nodes. After having obtained an access authorization 1008a of a user 1008, at least a BS 1004 issues a request message 1004a to a target sensor node 1010 in WSN 1006. Based on request message 1004a, target sensor node 1010 requests at least a controlling node in WSN 1006 for sensing data sensed by the at least a controlling node, and checks if the requirements of access authorization 1008a of user 1008 are met according to the sensing data. Whether the target sensor node responds with the required multimedia data or not is based on the checking result.

The at least a controlling node is also a sensor node of WSN 1006, such as, sensor node 1021-1024, and may refer to at least a type of physical environment information, such as, temperature, humidity, luminance, vibration, and so on, to determine whether to respond with the sensing data to target sensor node 1010 for executing the determination of access authorization 1008a. If the responded sensing data meets the requirements of access authorization 1008a of user 1008, target sensor node 1010 will respond with the multimedia data, such as video or audio data, meeting access authorization 1008a to BS 1004. BS 1004 then transmits the multimedia data to the server for providing to the user. If not meeting access authorization 1008a of user 1008, target sensor node 1010 responds with an access denied message.

The manner in which the controlling nodes transmit sensing data may target a type of sensing data to find the sensing data returned by the at least a controlling node, then compute statistics of the returned sensing data, such as, average, majority, maximum or minimum, as the final reference sensing data.

Request message 1004a issued by BS 1004 may further include a verification parameter. The verification information is to provide to the one or more intermediate routing nodes between BS 1004 to target sensor node 1010 as a parameter for future verification of reply message. For example, the routing node may use the parameter to check whether the reply message is modified by the attacker or illegal; if so, the reply message is discarded during the immediate process.

User 1008 may provide ID and password to login to a server 1002, such as a web server. Then, the server may verify the user identity and issues a request to BS 1004. Based on request 1002a, BS 1004 may obtain access authorization 1008a of user 1008 from server 1002 through Internet.

Figure 11:
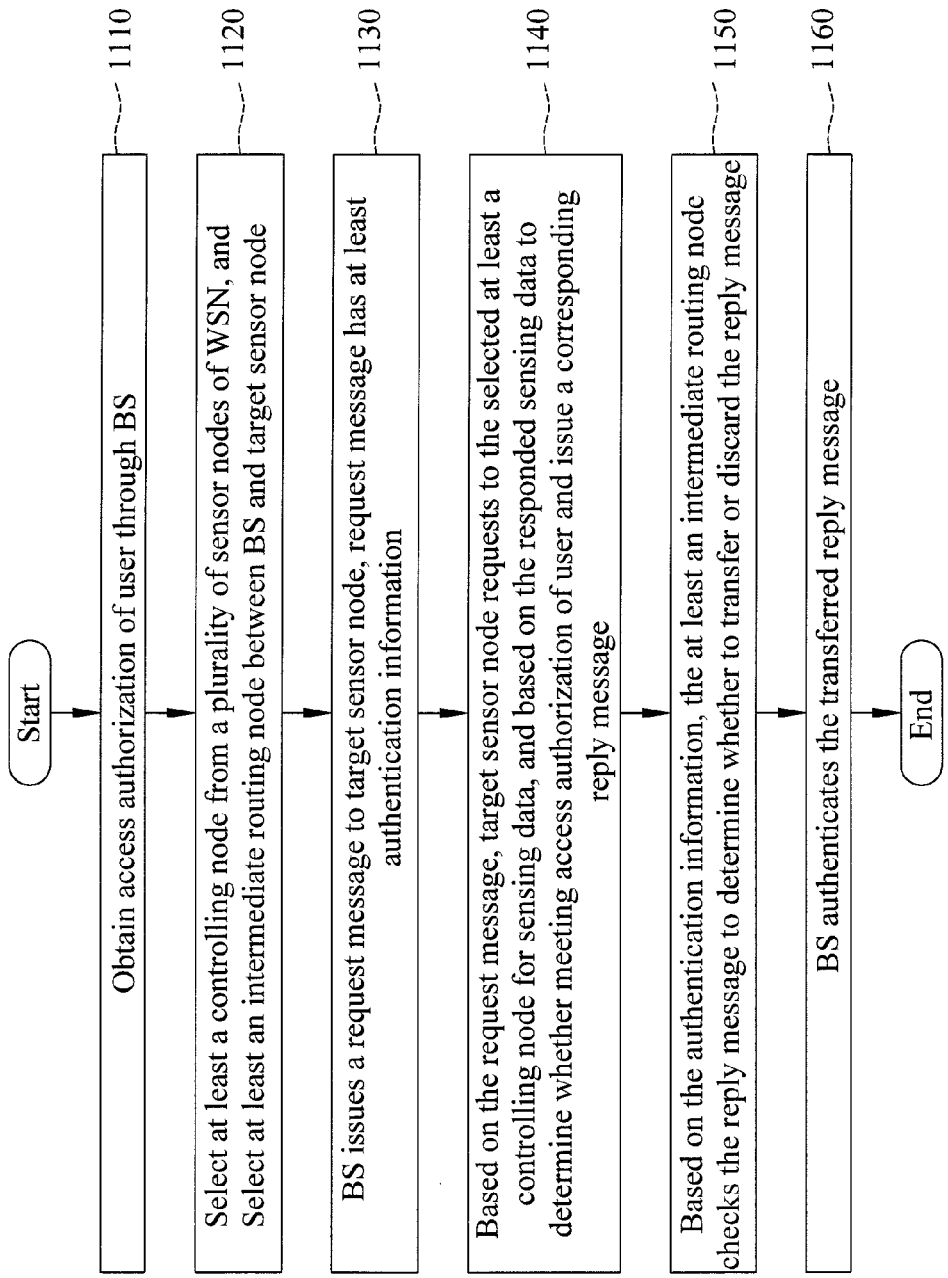
FIG. 11 shows an exemplary flowchart of an access authorization method for a wireless sensor network, consistent with certain disclosed embodiments.

FIG. 11 shows an exemplary flowchart of an access authorization method for a wireless sensor network, consistent with certain disclosed embodiments. Referring to the exemplary flowchart, the access authorization of user 1008 is obtained through BS 1004, as shown in step 1110. In step 1120, at least a controlling node is selected from a plurality of sensor nodes of WSN 1006, and at least an intermediate routing node between BS 1004 and target sensor node 1010 is also selected. In step 1130, BS 1004 issues a request message 1004a to target sensor node 1010, request message 1004a having at least authentication information. Based on request message 1004a, target sensor node 1010 requests to the selected at least a controlling node for sensing data, and based on the responded sensing data to determine whether requirements of access authorization 1008a of user 1008 are met and issue a corresponding reply message, as shown in step 1140. Based on the authentication information, the at least an intermediate routing node checks the reply message to determine whether to transfer or discard the reply message, as shown in step 1150. If the reply message is transferred, BS 1004 will authenticate the transferred reply message, as shown in step 1160.

Figure 12:
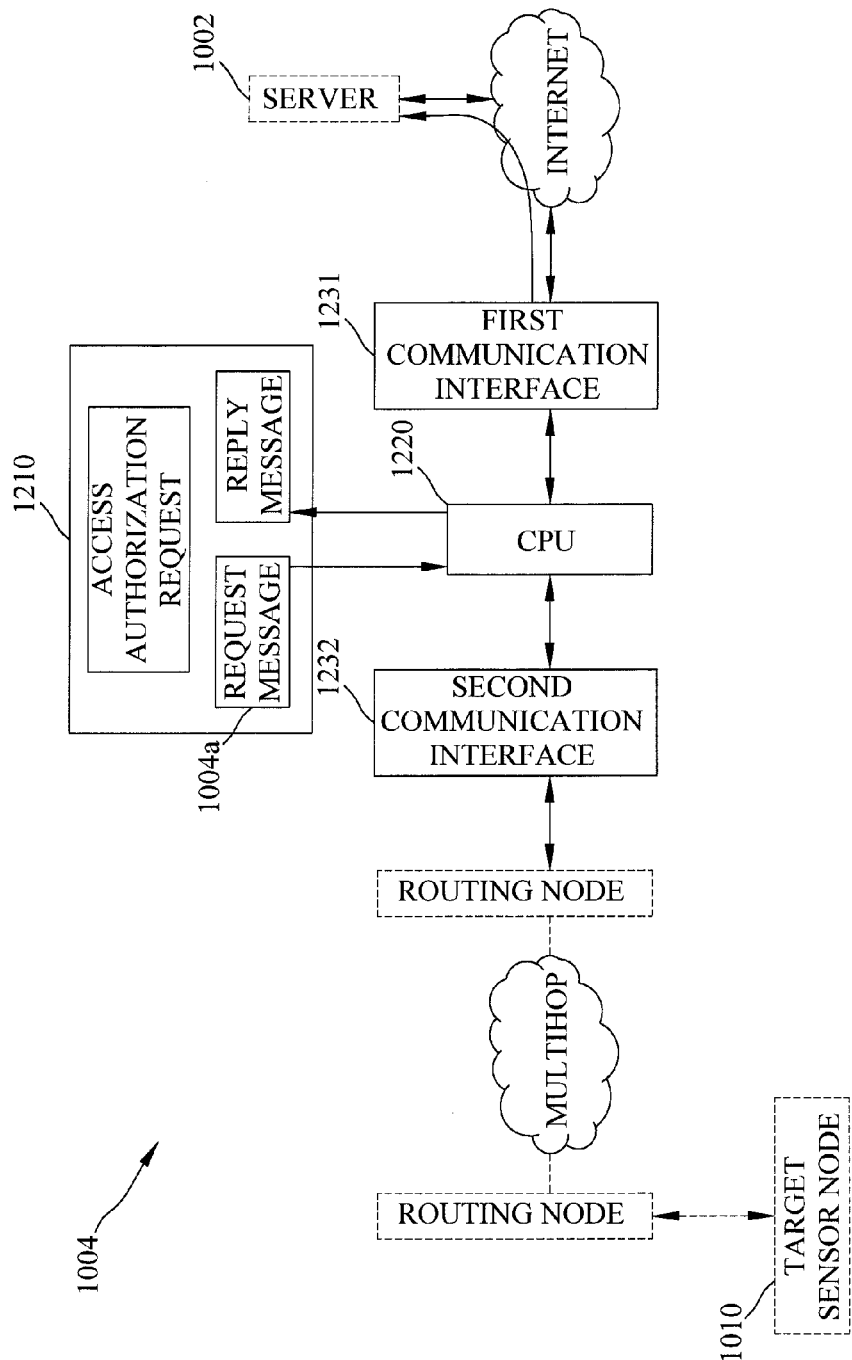
FIG. 12 shows an exemplary schematic view of a base station, consistent with certain disclosed embodiments.

BS 1004 may further include a storage unit, a central control unit (CPU) and a first communication interface and a second communication interface. As shown in the exemplar of FIG. 12, storage unit 1210 will store data, such as, access authorization of user 1008, request message 1004a, reply message, and so on. Based on the access authorization of the user, CPU 1220 transmits request message 1004a to target sensor node 1010 through second communication interface 1232 and transmits the multimedia data returned by target sensor node 1010 to server 1002 through first communication interface 1231. First communication interface 1231 will execute bi-directional communication with server 1002. Second communication interface 1232 will communicate with sensor node or intermediate routing node of WSN.

Figure 13:
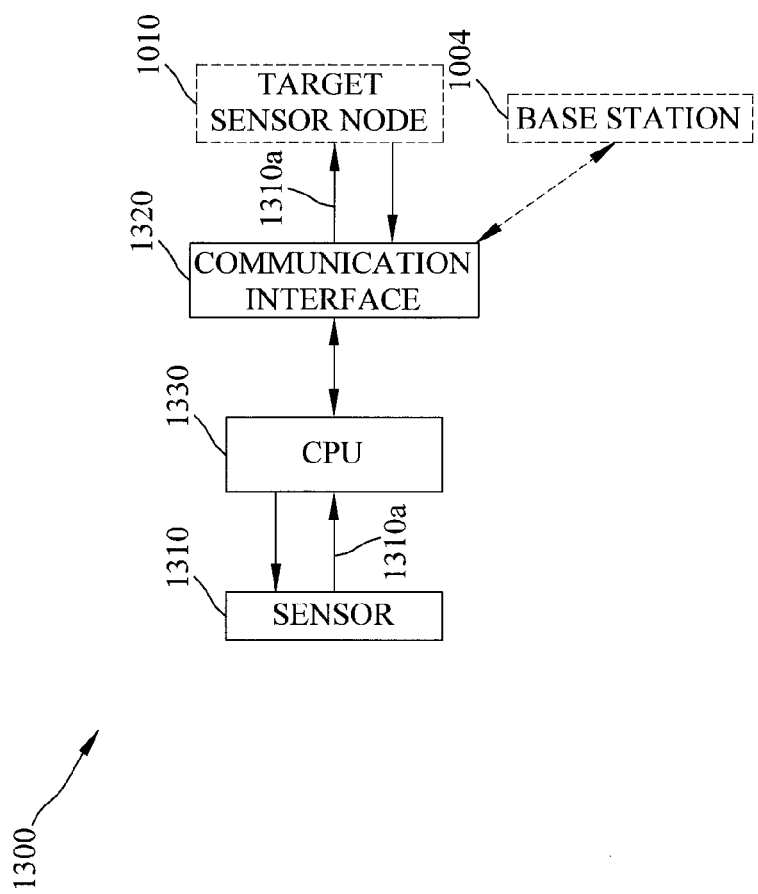
FIG. 13 shows an exemplary schematic view of a controlling node, consistent with certain disclosed embodiments.

Each controlling node 1300 may further include at least a sensor, a communication interface and a CPU. As shown in the exemplar of FIG. 13, at least a sensor 1310 senses at least a type of physical environment information, such as, temperature, humidity, luminance, pressure, gas, density, and so on. Communication interface 1320 communicates bi-directionally with BS 1004 and target sensor node 1010. CPU 1330 instructs sensor 1310 to sense and uses communication interface 1320 to transmit sensed data 1310a sensed by sensor 1310 back to target sensor node 1010.

Figure 14:
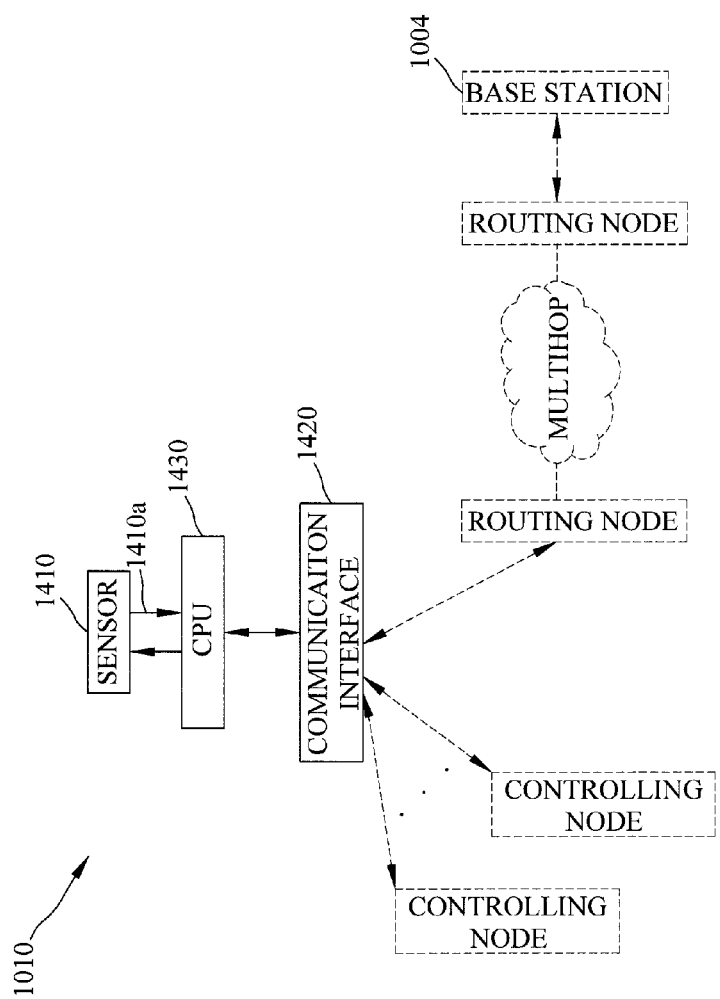
FIG. 14 shows an exemplary schematic view of a target sensor node, consistent with certain disclosed embodiments.

Target sensor node 1010 may further include at least a sensor, a communication interface and a CPU. As shown in the exemplar of FIG. 14, communication interface 1420 communicates bi-directionally with BS 1004 and each controlling node. Based on request message 1004a from BS 1004, CPU 1430 requests to each controlling node for sensing data through communication interface 1420, and based on sensing data to determine whether to instruct at least a sensor 1410 to capture multimedia data 1410a to transmit back to BS 1004.

Second communication interface 1232, communication interface 1420 and communication interface 1320 may use wireless transmission, such as, multihop short distance communication protocols, like, IEEE 802.15.4 WSN or Blue tooth. First communication interface 1231 may use either wired or wireless communication, such as, Ethernet, IEEE 802.11 wireless network, WiMax, 3G, 3.5G, GPRS, and so on.

Request message 1004a from BS 1004 includes verification information. In disclosed access authorization technology, all the related reply messages also include an evidence to prove that the reply message is verified by the access authorization; for example, the controlling node indeed returns the sensing data to the target sensor node, target sensor node indeed verifies the access authorization of the user, and so on. Based on different verification keys transmitted by requests, the selected intermediate routing node may verify whether to route these reply messages to the next node. That is, the correctness of the reply messages may be verified earlier by using the randomly selected nodes from the intermediate routing nodes.

When BS issues requests to read the multimedia data of the target sensor node, BS will inform the target sensor node, based on the access authorization of the user, of the controlling nodes of the same region which are to request the sensing data to. There are many exemplary ways for the selection of the controlling nodes and the computation methods of sensing data; for example, randomly or fixedly selecting a controlling node from a plurality of same type of controlling nodes as the sensing data of a certain type, randomly or fixedly selecting some or all controlling node from a plurality of a certain type of controlling nodes and computing the average or majority as the sensing data of that type. If the system includes a single controlling node and sensors of a plurality of types, one or some controlling nodes may be randomly or fixedly selected and the average or majority computed as the sensing data of that type. The random or fixed selection of controlling node may reduce the impact caused by controlling node sabotaged by the attackers, such as, sabotaging some controlling nodes to send fake sensing data or sabotaging intermediate routing nodes to send fake reply message.

The disclosed exemplary embodiments use a node-movement detection protocol to prevent nodes, such as, target sensor node or controlling node, from being moved. This protocol uses the neighbor nodes of a node to monitor the change of relative distance to the node to prevent the node from being moved or attacked. The initialization of this protocol may be executed after the network is deployed and without any attackers presence. For example, each node broadcasts n beacon packets to neighbor nodes, and each node computes, based on the beacon packets from the neighbor nodes, the distance to each neighbor node. The computation result is recorded and marked as reference set {d1, d2, . . . , dn}. After the protocol initialization, each node may execute this protocol to detect whether the node itself has been moved.

The execution of the protocol is described as follows. Each node broadcasts n beacon packets to neighbor nodes. Then, each node computes, based on the beacon packets received from the neighbor nodes, the distance to each neighbor node. The computation result is recorded and marked as the test set {d1', d2', . . . , dn'}. Each neighbor node compares the difference between the reference set and the test set. There are several ways for the comparison, such as, a difference less than a tolerance threshold may be reported as unmoved, while a difference higher than the tolerance threshold is reported as moved.

Figure 15:
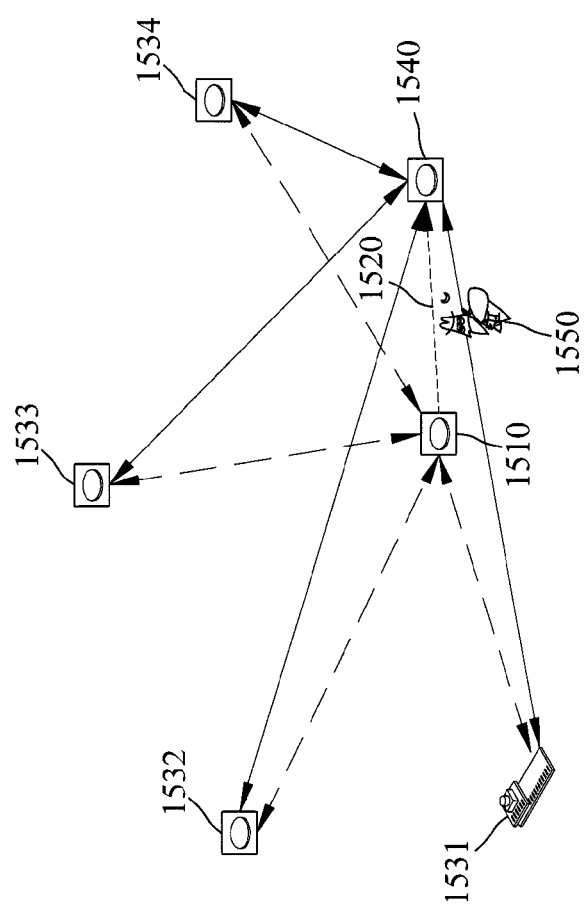
FIG. 15 shows an exemplary schematic view of detecting node-movement, consistent with certain disclosed embodiments.

As shown in the exemplar of FIG. 15, when a node 1510 is moved (as marked by arrow 1520), the relative distance between this node and each neighbor node, such as, neighbor nodes 1531-1534, will be changed, where the dash line indicates the original distance between node 1510 and neighbor node, and the solid line indicates the distance between node 1510 (now 1540) and neighbor node after node 1510 (now 1540) is moved. Hence, when a node receives a report on a distance exceeding threshold, the node itself has been moved. This node may determine that the node itself has been moved by attacker 1550. In other words, by using neighbor nodes to compute the distance and comparing with the previously recorded distance, each node may be informed by the neighbor nodes whether the node has been moved. To reduce the error caused by the environment, various approaches, such as, increasing n, increasing the number of neighbor nodes, or adjusting the thresholds, may be used.

The following defines the meaning of the symbols, and uses an exemplar to describe the disclosed contents.
A→B:M means that A transmits message M to B,
$\{M\}_k$ means that message M is encrypted,
MAC(M,K) means that key K is used to compute the authentication code of message M,
H(•) means a one-way hash function,
M||N means that message M is concatenated to message N,
⊕ means the exclusive OR (XOR),
$ID_i$ means the identity of i,
$R_i$ means the reading of sensing data sensed by i,
$K_i$ means the point-to-point key shared by i and BS, and
$K_{i,j}$ means the point-to-point key shared by i and j.

Take the scenario of WSN of FIG. 4 as example. Assume that the requirements for access authorization of a user are: read video data when the physical environment has temperature higher than 30 degree, luminance is higher than 200 lm, and the humidity is less than 30%. When BS 402 obtains the access authorization of this user, such as, receiving a command from a server, assume that BS 402 randomly or fixedly selects the reading of a luminance sensor (marked as SC1) in reference region 408, the averages of the readings of three temperature sensors (marked as SC2, SC3, SC4) in reference region 408 and a plurality of readings of four humidity sensors (marked as SC5, SC6, SC7, SC8) in region 408, then the common format of the request issued by BS 402 to target sensor node 404 is as shown in FIG. 16, consistent with certain disclosed embodiments.

In the exemplar of FIG. 16, the fields of the common format may include the identity of the request QID, a verification parameter C', encrypted user's access authorization $\{acc\_auth\}_k$, a random number N, sensing data type and computation method for the selected controlling node, identity of the selected controlling node, and the valid coverage range of the sensing data. Take aforementioned BS 402 random selection as example. The request transmitted by BS 402 to target sensor node 404 may include QID, C', $\{acc\_auth\}_k$, N and three types, i.e., luminance sensor (SC1), three temperature sensors (SC2, SC3, SC4) and four humidity sensors (SC5, SC6, SC7, SC8) of sensing data types and computation method. The identity and valid-range of the sensing data of these three types of sensors may be expressed as follows:
QID, C', $\{acc\_auth\}_k$, N,
{luminance_average: $ID_{SC1}$, first valid_range},
{tempature_average: $ID_{SC2}$, $ID_{SC3}$, $ID_{SC3}$, second valid_range},
{humidity_majority: $ID_{SC5}$, $ID_{SC6}$, $ID_{SC7}$, $ID_{SC8}$, third valid_range},
where first valid_range is the average of the luminance reading of luminance sensor SC1, second valid_range is the average of the temperature readings of three temperature sensors (SC2, SC3, SC4), and third valid_range is the majority of the humidity readings of four humidity sensors (SC5, SC6, SC7, SC8).

Verification parameter C' is a parameter used by each intermediate routing node between BS 402 and target sensor node 404 as a parameter of the reply message.

Figure 17:
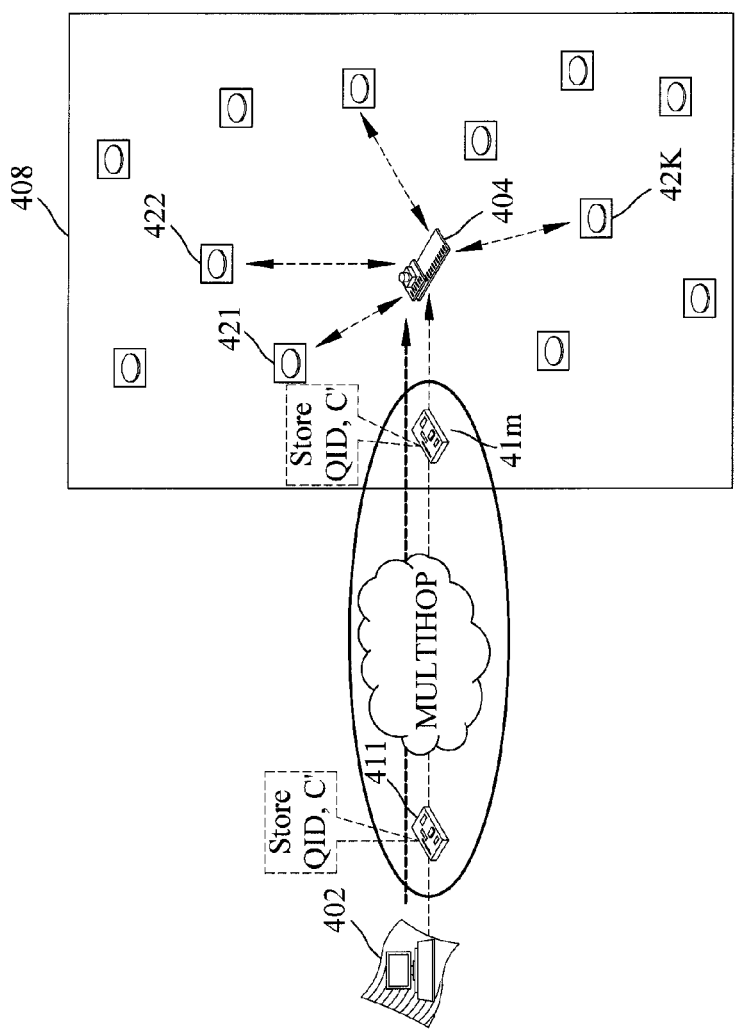
FIG. 17 shows an exemplary schematic view illustrating the operation of the intermediate routing node processing a request message, consistent with certain disclosed embodiments.

Take the above request as example, an example of computing verification parameter C' is expressed as follows:
Let $C_{SCi} = N \oplus K_{SCi}$, i=1, 2, . . . , 8
And $C = h(C_{SCi}) \oplus \ldots \oplus (S_{SC8})$, then compute $C' = h(C_{SCi})$ When the request is sent out, each intermediate routing node 411-41m between BS 402 to target sensor node 404 stores QID and C', and routes the request to the next node, as shown in FIG. 17, consistent with certain disclosed embodiments. The stored values may be automatically deleted by the node after transmitting reply message or a period of time to save the storage space of the node.

When target sensor node 404 receives the request, the request is decrypted to extract the acc_auth and executes the node-movement detection protocol to determine whether the node itself has been moved. If target sensor node 404 finds itself moved, BS 402 is notified and the subsequent process is terminated; otherwise, target sensor node 404 executes the following operations, according to the request message, to request the reading of the sensing data from the controlling node:

Target sensor node→SC1: N, <luminance>,
Target sensor node→SC2, SC3, SC4: N, <temperature>,
Target sensor node→SC5, SC6, SC7, SC8: N, <humidity>.

After controlling node receives the message from target sensor node 404, controlling node may execute node-movement detection protocol to determine whether the controlling node itself has been moved. If controlling node finds itself moved, controlling node notifies BS 402 for the subsequent processing; otherwise, controlling node executes the following operation to reply to target sensor node 404 with the requested readings:

SCi→target sensor node: $R_{SCi}$, i=1, 2, . . . , 8.

After target sensor node 404 receives the reading from the controlling node, target sensor node 404 executes the computation (such as, average or majority) and then checks whether the computation result matches the acc_auth and the valid-ranges. If any mismatch exists, the event is reported to BS 402 and the subsequent processing is terminated; otherwise, target sensor node 404 encrypts the multimedia data and executes the following operation to transmit the encrypted multimedia data to each controlling node:

Target sensor node→SCi: h({multimedia data}$_k$), i=1, 2, . . . , 8.

After each controlling node SCi receives the above message, the controlling node uses random number N and the shared key $K_{SCi}$ with BS 402 to compute $S_{SCi}$ and executes the following operations to encrypt $h(C_{SCi})$ and transmit the encrypted $h(C_{SCi})$ with a message authentication code i_MAC to target sensor node 404:

---

SCi->target sensor node:{$h(C_{SCi})$}$_k$, i_MAC, i=1, 2, ..., 8.
where i_MAC=MAC($R_{SCi}$||h({multimedia data}$_k$),h($C_{SCi}$||$K_{SCi}$)).

---

Target sensor node 404 decrypts to extract each $h(C_{SCi})$ to compute C, luminance message authentication code $MAC_L$, temperature message authentication code $MAC_T$, and humidity message authentication code $MAC_H$, and then further computes a multi-mode message authentication code SMAC by using $MAC_L$, $MAC_T$, $MAC_H$ as follows:

---

C=$h(C_{SC1})$⊕ ... ⊕$h(C_{SC8})$,
$MAC_L$=MAC($R_{SC1}$||h({multimedia data}$_k$), h($C_{SC1}$||$K_{SC1}$)),
$MAC_T$=MAC($R_{SC2}$||h({multimedia data}$_k$), h($C_{SC2}$||$K_{SC2}$)) ⊕
 MAC($R_{SC3}$||h({multimedia data}$_k$), h($C_{SC3}$||$K_{SC3}$)) ⊕
 MAC($R_{SC4}$||h({multimedia data}$_k$), h($C_{SC4}$||$K_{SC4}$)),
$MAC_H$=MAC($R_{SC5}$||h({multimedia data}$_k$), h($C_{SC5}$||$K_{SC5}$)) ⊕...
 ⊕MAC($R_{SC8}$||h({multimedia data}$_k$), h($C_{SC8}$||$K_{SC8}$)),
SMAC=$MAC_L$⊕$MAC_T$⊕$MAC_H$

---

Then, target sensor node 404 executes the following operations to transmit reply message Reply_message to BS 402:
Target sensor node→BS: Reply_message, where reply message Reply_message containing QID, C, paired {$ID_{SCi}$: $R_{SCi}$}, $MAC_L$, $MAC_T$, $MAC_H$, {multimedia data}$_k$, and {SMAC}$_k$, i=1, 2, . . . , 8, paired {$ID_{SCi}$: $R_{SCi}$} are the identity of controlling node SCi randomly selected by BS 402 and the reading reported by the controlling node SCi.

Figure 18:
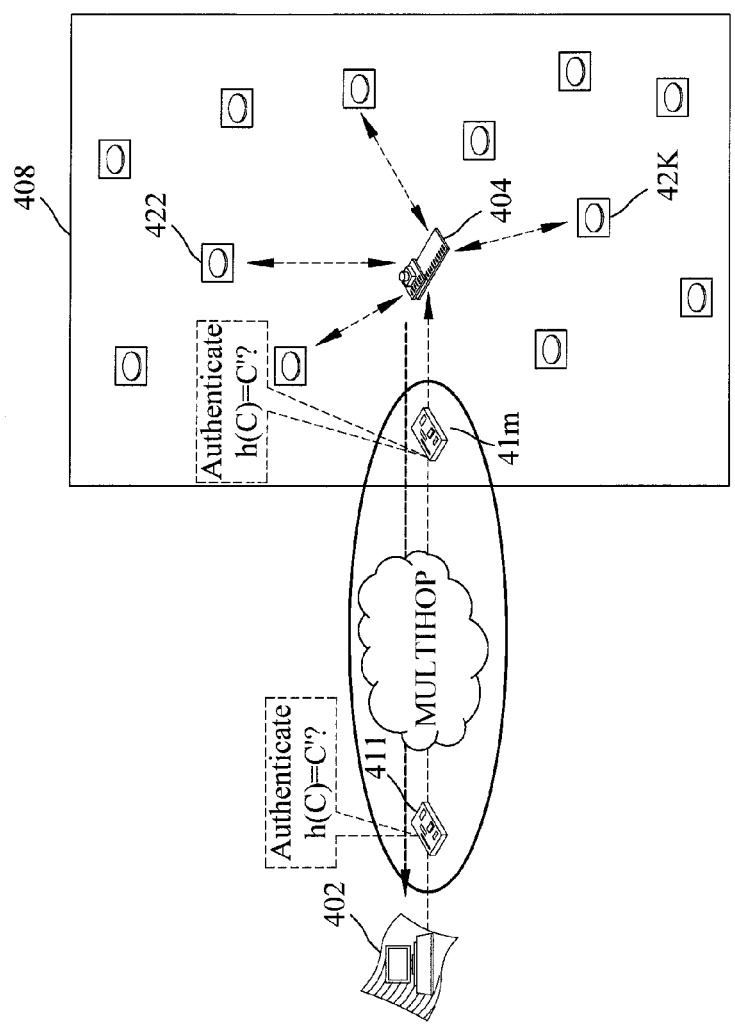
FIG. 18 shows an exemplary schematic view illustrating the operation of intermediate routing node processing a reply message, consistent with certain disclosed embodiments.

During the process of transmitting the reply message, each intermediate routing node must use QID to authenticate whether h(C) equals C'. If not, the reply message is discarded; otherwise, the reply message is routed to the next node, as shown in FIG. 18, consistent with certain disclosed embodiments.

When the reply message arrives at BS 402, BS 402 authenticates whether h(C) equals C', all the readings match the acc_auth and valid-range, and SMAC is correct. If all of the above are correct, the image, i.e., {multimedia data}$_k$, is decrypted and transmitted to the server to provide the user; otherwise, the reply message is discarded.

The following describes how to increase the authentication capability for $MAC_L$, $MAC_T$, $MAC_H$ of the intermediate routing nodes. When BS 402 initially transmits request message to target sensor node 404, BS 402 may randomly select some intermediate routing nodes and sends different authentication keys along with the request message to these randomly selected intermediate routing nodes. These intermediate routing nodes owning partial authentication keys then have the capability to authenticate $MAC_L$, $MAC_T$, $MAC_H$.

For example, assume that BS 402 transmits respectively authentication key h($C_{SC2}$||$K_{SC2}$)||h($C_{SC3}$||$K_{SC3}$)||h($C_{SC4}$||$K_{SC4}$) to a first intermediate routing node and authentication key h($C_{SC1}$||$K_{SC1}$) to a second intermediate routing node. Then, when target sensor node 404 returns image message to BS 402, the first intermediate routing node may authenticate $MAC_T$, and the second intermediate routing node may authenticate $MAC_L$. In this manner, unauthorized reply messages may be discovered and filtered by intermediate routing nodes during the returning process, instead of at the BS so as to save resource in transmitting unauthorized messages.

The disclosed access authorization technology for WSN may also resist the attack models of FIG. 5-FIG. 9 so that the attackers cannot use these attacks to bypass the access authorization control or obtain illegal access authorization. The following analysis shows the security of the disclosed exemplary embodiments.

Because the reply message from the target sensor node to BS include parameter C, and parameter C is an information computed by all the randomly or fixedly selected controlling nodes, therefore, even if the target sensor node is attacked and compromised, the target sensor node cannot reply to BS before requesting the readings from all the controlling nodes. The attacker cannot send any fake message to BS. In addition, each intermediate routing node will authenticate parameter C and discard any reply message not containing correct C.

Because reading $R_{SCi}$ returned by each randomly or fixedly selected controlling node SCi must use the parameter of the key shared with BS to compute message authentication code MAC, such as, $MAC_L$, $MAC_T$, $MAC_H$, and all the randomly selected intermediate routing nodes and BS will authenticate the correctness of MAC. Any reply message not containing correct MAC will be discarded immediately. Therefore, the sabotaged target sensor node cannot fake readings matching the access authorization and the attacker cannot change the reading.

When computing the key of MAC, parameter $C_{SCi}$ must be included and parameter $C_{SCi}$ is computed by random number N generated by BS each time. Therefore, the attacker cannot re-send the reading and MAC.

Because any randomly selected intermediate routing node will partially authenticate MAC, such as, $MAC_L$, $MAC_T$, $MAC_H$, the tempered multimedia will be discarded by the intermediate routing nodes before arriving at BS. Hence, the attacker cannot temper the multimedia data returned by target sensor node.

Although the disclosed exemplary embodiments use the randomly selected intermediate routing nodes to authenticate the correctness of MAC at an early stage, the attack still can sabotage the randomly selected intermediate routing nodes and then fake the reading and MAC. Because the randomly selected intermediate routing nodes have key for authenticating MAC, the randomly selected intermediate routing nodes may compute the correct MAC. However, when BS receives reply message, BS will decrypt and authenticate SMAC, thus, any tempered MAC, such as, $MAC_L$, $MAC_T$, $MAC_H$, will be discovered at BS because of authenticating SMAC.

Movement of target sensor node or any other controlling nodes will be detected by node-movement detection protocol. Hence, the disclosed exemplary embodiments may assure that the nodes will not be moved to unsuitable location or environment, and the precision of detection may be determined depending on the environment and the hardware sensitivity.

In summary, the disclosed exemplary embodiments may provide an access authorization apparatus and method for WSN. The reply message includes an authentication parameter C, indicating the authentication and validity of the reply message. The random or fixed selection of nodes, including the selection of controlling nodes and the intermediate routing nodes to authenticate request or reply messages, as well as, the reference to the majority of readings returned by the sensor nodes may all reduce the impact of the possible attacks. The erroneous data will also be discovered and filtered by intermediate routing nodes to save the WSN resource. The disclosed exemplary embodiments only use light-weighted computation, such as, XOR, uni-directional hash function, symmetric key encryption, and so on, to realize the security function; hence, the light-weighted computation is suitable for WSN environments.

Furthermore, each intermediate routing node only needs to store QID and C' (<10 bytes). Some randomly selected intermediate routing nodes only need to store some more authentication keys, such as, 16 bytes for an encryption key of AES-128. These stored values may be automatically deleted by the nodes after the reply message is returned or after a period of time. The disclosed security access control mechanism may prevent nodes from a variety of attack models or movement, and may be applied to multi-mode WSN access authorization. The sensors of the multi-mode WSN may be used for sensing, such as, temperature, humidity, luminance, pressure, gas, density, and so on.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An access authorization apparatus for a wireless sensor network, comprising:
   a wireless sensor network formed by a plurality of sensor nodes, each of said sensor nodes collecting sensing data and multimedia data; and
   at least a base station for receiving a request of an access authorization from a user for accessing multimedia data based on sensing data requirements;
   wherein said at least a base station issues a request message to a target sensor node selected from said sensor nodes, and said target sensor node requests at least a controlling node selected from said sensor nodes for said sensing data sensed by said at least a controlling node, and refers to the sensing data returned by said at least a controlling node to check if the sensing data returned meet said sensing data requirements, and returns said multimedia data collected by said target sensor node to said at least a base station if the sensing data returned meet said sensing data requirements.

2. The apparatus as claimed in claim 1, wherein said at least a controlling node is a wireless sensor node in said wireless sensor network, and provides at least a type of sensing data of physical environment information for returning to said target sensor node.

3. The apparatus as claimed in claim 1, wherein said request message further includes authentication information, said authentication information is provided to each of intermediate routing nodes between said at least a base station and said target sensor node for using as a parameter in a future authentication reply message.

4. The apparatus as claimed in claim 1, wherein said at least a base station further includes:
   a first communication interface and a second communication interface;
   a storage unit for storing data; and
   a central processing unit (CPU) that transmits said access authorization through said second communication interface to said target sensor node and transmits the multimedia data returned by said target sensor node through said first communication interface to a server.

5. The apparatus as claimed in claim 1, wherein each of said at least a controlling node further includes:
   at least a sensor that senses at least a type of physical environment information;
   a communication interface that communicates with said at least a base station and said target sensor node; and
   a central processing unit (CPU) that instructs said at least a sensor to sense said sensing data and returns said sensing data of said at least a sensor through said communication interface.

6. The apparatus as claimed in claim 1, wherein said target sensor node further includes:
   at least a sensor that captures said multimedia data;
   a communication interface that communicates with said at least a base station and said at least a controlling node; and
   a central processing unit (CPU), based on said request message to request said at least a controlling node for sensing data through said communication interface, and based on the sensing data returned to determine whether to return said multimedia data to said at least a base station.

7. The apparatus as claimed in claim 1, wherein said at least a controlling node executes a node-movement detection protocol to check and base on whether said at least a controlling node has been moved to determine whether to return said sensing data.

8. The apparatus as claimed in claim 1, wherein said target sensor node executes a node-movement detection protocol to check and base on whether said target sensor node has been moved to determine whether to return a reply message.

9. The apparatus as claimed in claim 1, wherein said wireless sensor network is a multi-mode wireless sensor network.

10. The apparatus as claimed in claim 1, wherein a plurality of controlling nodes exists in a same region as said target sensor node to provide sensing data to said target sensor node for performing determination of said access authorization of said user, and said same region of said target sensor node represents a region that said target sensor node can communicate with other sensor nodes.

11. An access authorization method for a wireless sensor network, said method comprising the steps of:
receiving a request of an access authorization from a user through at least a base station for accessing multimedia data based on sensing data requirements;
selecting a target sensor node and at least a controlling node from a plurality of sensor nodes in said wireless sensor network, each of said sensor nodes collecting sensing data and multimedia data;
issuing a request message to said target sensor node from said at least a base station, said request message at least having authentication information;
requesting said at least a controlling node for said sensing data collected by said at least a controlling node from said target sensor node based on said request message, and referring to the sensing data returned by said at least a controlling node to determine whether the sensing data returned meet said sensing data requirements; and
returning said multimedia data collected by said target sensor node to said at least a base station if said sensing data returned meet said sensing data requirements.

12. The method as claimed in claim 11, wherein said at least a controlling node is either randomly selected or fixedly selected.

13. The method as claimed in claim 11, wherein said method uses a plurality of neighbor nodes of a node to inform said node whether said node has been moved, wherein said node is either a controlling node or said target sensor node.

14. The method as claimed in claim 11, wherein for a type of sensing data, said method refers to the sensing data returned by said at least a controlling node, and computes statistics of the returned sensing data to determine whether the returned sensing data meet said sensing data requirements.

15. The method as claimed in claim 11, wherein said request message further includes an identity of said request message, an authentication parameter, encrypted access authorization of said user, a random number, a sensing data type and a computation method of said sensing data, and an identity and a valid range of said sensing data.

16. The method as claimed in claim 15, wherein said authentication parameter is provided to at least an intermediate routing node for use as a parameter in a future reply message.

17. The method as claimed in claim 16, wherein when said request message is sent, each of said at least an intermediate routing node stores the identity of said request message and said authentication parameter and routes said request message to a next node.

18. The method as claimed in claim 11, wherein when said target sensor node receives said request message, said target sensor node decrypts said request message to extract said access authorization of said user and determines whether said target sensor node has been moved.

19. The method as claimed in claim 11, wherein when said at least a controlling node receives a request for sensing data from said target sensor node, said at least a controlling node determines whether said at least a controlling node has been moved, notifies said at least a base station that said at least a controlling node has been moved if said at least a controlling node has been moved, and returns said sensing data to said target sensor node if said at least a controlling node has not been moved.

20. The method as claimed in claim 11, wherein after said target sensor node receives the sensing data returned by said at least a controlling node, said target sensor node and said at least a controlling node execute the following steps of:
computing statistics of the returned sensing data in said target sensor node to determine whether the returned sensing data meet said sensing data requirements;
returning a reply message with encrypted multimedia data of said target sensor node from said target sensor node to each of said at least a controlling node if the returned sensing data meet said sensing data requirements;
upon receiving said encrypted multimedia data, using a corresponding encrypted parameter and a corresponding message authentication code (MAC) to respond to said target sensor node from each of said at least a controlling node; and
decrypting said encrypted parameter and computing said authentication information of said request message and a multi-mode MAC in said target sensor node.

21. The method as claimed in claim 20, wherein said target sensor node returns a reply message to said at least a controlling node, said reply message further includes at least an identity of said request message, said authentication information, said multi-mode MAC, and an identity and the returned sensing data of each of said at least a controlling node.

22. The method as claimed in claim 20, wherein said at least a base station authenticates encrypted authentication information to determine whether an authentication parameter, said access authorization of said user, a valid range of said sensing data, and said multi-mode MAC are all correct before returning decrypted multimedia data for said user.

23. The method as claimed in claim 11, further comprising the steps of:
selecting at least an intermediate routing node between said at least a base station and said target sensor node, and issuing a reply message from said target sensor node to said at least an intermediate routing node;
receiving said reply message at said at least an intermediate routing node, and checking said reply message based on said authentication information to determine whether to discard or to transfer said reply message; and
authenticating the transferred reply message through said at least a base station.

24. The method as claimed in claim 23, wherein a plurality of intermediate routing nodes exists between said at least a base station and said target sensor node, and said at least an intermediate routing node is either randomly selected or fixedly selected from said plurality of intermediate routing nodes.

25. The method as claimed in claim 23, wherein said at least an intermediate routing node authenticates encrypted authentication information based on an identity and an authentication parameter of said request message to determine whether to discard or to transfer said reply message.

* * * * *